Oct. 6, 1970 P. R. YEAGER 3,531,978

THERMOPILE VACUUM GAGE TUBE SIMULATOR

Filed Sept. 13, 1968

INVENTOR.
PAUL R. YEAGER
BY
*[signatures]*
William H. King
ATTORNEYS

United States Patent Office 3,531,978
Patented Oct. 6, 1970

3,531,978
THERMOPILE VACUUM GAGE TUBE SIMULATOR
Paul R. Yeager, Grafton, Va., assignor to the United States of America as represented by the Administrator of the National Aeronautics and Space Administration
Filed Sept. 13, 1968, Ser. No. 759,665
Int. Cl. G01l 27/00
U.S. Cl. 73—4
4 Claims

ABSTRACT OF THE DISCLOSURE

A device for simulating the actions of a thermopile vacuum gage tube at high and low pressures. A battery in series with a first resistor simulates the voltage generated by the gage tube when operating at atmospheric pressure, and the battery in series with a second resistor simulates the voltage generated by the gage tube while exposed to a vacuum. Three other equal resistors are connected together at a common junction to simulate the resistances of the thermocouples in the gage tube. The device is used to check out thermopile vacuum gage circuits.

---

Figure 1:
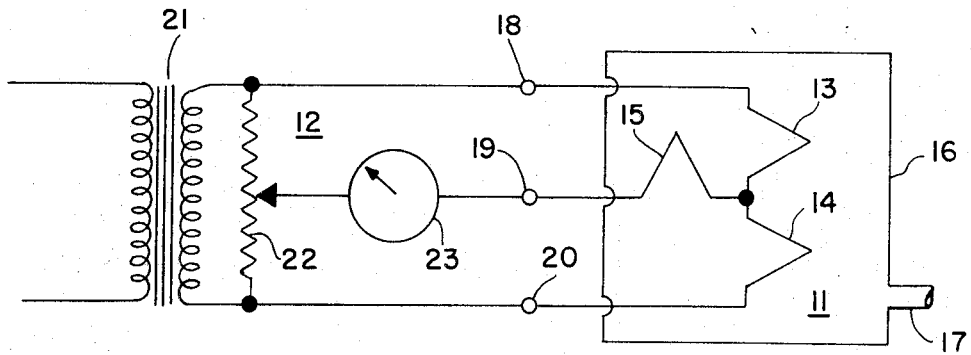

The invention described herein was made by an employee of the United States Government and may be manufactured and used by or for the Government for governmental purposes without the payment of any royalties thereon or therefor.

The invention relates generally to a device for simulating the actions of an electrical element and more specifically concerns a device for simulating the actions of a thermopile vacuum gage tube at high and low pressure.

Prior to this invention, thermopile vacuum gage circuits were checked out by connecting an actual thermopile gage tube in the circuit and pulling a vacuum on the gage tube to obtain a low pressure reading, and opening the gage tube to atmosphere to obtain a high pressure reading. The disadvantages of this prior method of checking out thermopile vacuum gage circuits were the requirement to have a vacuum system, the long time required to pump the vacuum system down to a low pressure, the possibility of damaging a relatively expensive vacuum gage tube, and in the case of wind tunnel use, the problem of actually connecting the thermopile vacuum gage tube to the vacuum.

It is therefore an object of this invention to decrease the disadvantages of the prior method of checking out thermopile vacuum gage circuits.

Another object of this invention is to provide a device for simulating the actions of a thermopile vacuum gage tube at high and low pressures that can be used to check out thermopile vacuum gage circuits.

Figure 2:
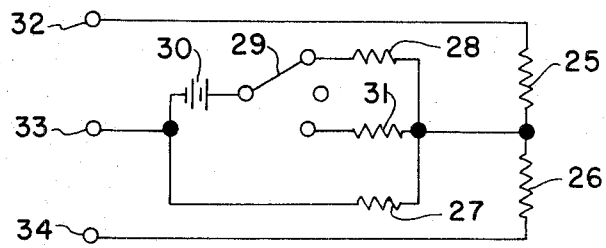

Other objects and advantages of this invention will become apparent hereinafter and in the drawings in which:

FIG. 1 is a thermopile vacuum gage circuit connected to a thermopile gage tube for the purpose of showing how thermopile vacuum gage circuits were checked out prior to this invention; and FIG. 2 is a schematic drawing of the invention.

Turning now to FIG. 1 the number 11 designates a thermopile vacuum gage and the number 12 designates a thermopile vacuum gage circuit. Gage 11 consists of three thermocouples, 13, 14 and 15, inside an enclosure 16. An opening 17 is provided for allowing the pressure in the space inside enclosure 16 to be lowered. Thermocouples 13, 14 and 15 are connected to terminals 18, 19 and 20, respectively. Circuit 12 consists of a transformer 21, a potentiometer 22 connected across the secondary of the transformer and a voltmeter 23, calibrated to read pressure, connected to the slider of potentiometer 22. In operation of the prior art device in FIG. 1, the space inside enclosure 16 is exposed to the atmosphere through opening 17. Then the slider of potentiometer 22 is adjusted until voltmeter 23 indicates the correct reading for atmospheric pressure. In this condition FIG. 1 is a slightly unbalanced Wheatstone bridge with the two sides of potentiometer 22 and thermocouples 13 and 14 being its four legs. Then gage 11 is exposed to the vacuum to be measured through opening 17. The resulting change in pressure inside enclosure 16 causes the Wheatstone bridge to become more unbalanced. The unbalanced voltage is measured by meter 23 which is indicative of the pressure of the vacuum.

When a device as shown in FIG. 1 is used to measure the pressure of partial vacuums the thermopile vacuum gage circuit should be checked out to insure that it is operating properly. In the past this has been done by connecting circuit 12 to gage 11, as shown in FIG. 1, pulling a vacuum on the gage tube to obtain a low pressure reading, and opening the gage tube to atmosphere to obtain a high pressure reading.

Referring now to FIG. 2 there is shown a device for simulating the actions of thermopile vacuum gage 11 which can be used in place of gage 11 to check out circuit 12. Resistors 25, 26 and 27, nominal value of 10 ohms, but which may be varried for exact match, simulate the resistances of thermocouples 13, 14 and 15, respectively, so that proper current drain from the gage circuit will occur. A resistor 28, nominal value of 15,000 ohms but which may be varied for exact match, is connected to a single pole, double throw, center-off switch 29 which is connected to a battery 30, nominal value 1.5 volts. When switch 29 is in the position shown the current that flows through resistor 28 due to battery 30 generates a voltage drop in the circuit that simulates the voltage generated by thermopile vacuum gage tube 11 when operating at atmospheric pressure. A resistor 31, having a nominal value of 1000 ohms, also is connected to switch 31. When resistor 31 is connected in the circuit with battery 30 the resulting current through resistor 31 generates a voltage drop in the circuit that simulates the voltage generated by thermopile vacuum gage tube 11 while exposed to a vacuum. Terminals 32, 33, and 34 are means for connecting the simulator to thermopile vacuum gage circuit 12.

In operation the simulator in FIG. 2 is connected to gage circuit 12. Switch 29 is put in its "off" position and the slider of potentiometer 22 is adjusted until meter 23 reads zero current. This insures that there will be no alternating curent passing through meter 23. Switch 29 is then positioned as shown. The resulting voltage imbalance causes a current flow past terminal 33 and is measured by meter 23 which gives a reading approximately equal to atmospheric pressure. Then switch 29 is positioned to connect resistor 31 in the circuit. The resulting reading on meter 23 is approximately equal to high vacuum. Improper functioning of gage circuit 11 or connecting cables will result in readings on meter 23 different from those above.

An advantage of this invention is that it permits the check out and troubleshooting of thermopile vacuum gage circuits by means of moving one switch instead of having to connect a gage tube to a vacuum system, and pump the system to a low pressure. Also, incorrect electrical connections can damage a gage tube, but the invention is not easily damaged, and if it is, is easily repaired, whereas the gage tube is not easily repaired.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed and certain features of the invention may be utilized independently of the use of other features, all without departing from the spirit or scope of the invention as defined in the subjoined claims. The values of the resistors and battery used by this invention can be different from those specified. Even though this invention has been disclosed for checking out circuit 12 in FIG. 1, it is to be understood that the invention could be used to check out many different types of thermopile vacuum gage circuits including transistor-oscillator power units. Resistors 25, 26 and 27 may be variable to match the exact thermocouple resistance to obtain more accurate simulation of an individual gage tube; and resistors 28 and 31 may be made variable to exactly match the "atmosphere" and "high vacuum" points on the meter read-out system.

What is claimed is:

1. A device for simulating the actions of a thermopile vacuum gage tube at high and low pressures to check out thermopile vacuum gage circuits comprising:

first, second, and third impedances with one *end* of each connected together such that each impedance is connected to the junction of the other two impedances and with the other end of each connected to a separate terminal;

a battery;

a fourth impedance which when connected in series with said battery simulates the action of a thermopile vacuum gage tube at high pressure;

a fifth impedance which when connected in series with said battery simulates the action of a thermopile vacuum gage tube at low pressure; and a switch having at least two positions for connecting said fourth impedance in series with said battery with the resulting series circuit connected in parallel with said first impedance when it is in one position and for connecting said fifth impedance in series with said battery with the resulting series circuit connected in parallel with said first impedance when it is in its other position whereby when said separate terminals are connected to a thermopile vacuum gage circuit said device can be used to simulate a thermopile vacuum gage tube at high and low pressures.

2. A device for simulating the actions of a thermopile vacuum gage tube according to claim 1 wherein said switch has a third position for disconnecting said battery whereby when said switch is in its third position and said separate terminals are connected to a thermopile vacuum gage circuit the resulting bridge circuit can be balanced to eliminate the current flowing through said first impedance.

3. A device for simulating the actions of a thermopile vacuum gage tube according to claim 1 wherein said first, second, third, fourth and fifth impedances are resistors.

4. A device for simulating the actions of a thermopile vacuum gage tube at high and low pressures comprising:

first, second and third impedances with one *end* of each connected together such that each impedance is connected to the junction of the other two impedances and with the other end of each connected to a separate terminal; and means connected in parallel with said first impedance for selectively generating voltages to simulate the voltages generated by said thermopile vacuum gage tube at high and low pressures whereby said separate terminals can be connected to thermopile vacuum gage circuits to check them out.

References Cited

UNITED STATES PATENTS

| | | | |
|---|---|---|---|
| 2,460,873 | 2/1949 | Clewell et al. | 73—399 |
| 2,876,417 | 3/1959 | Winram. | |
| 3,397,579 | 8/1968 | Harvey | 73—399 |

S. CLEMENT SWISHER, Primary Examiner

U.S. Cl. X.R.

324—74